United States Patent
Kim et al.

(10) Patent No.: US 7,733,560 B2
(45) Date of Patent: Jun. 8, 2010

(54) FLEXIBLE ELECTROPHORETIC DISPLAY AND METHOD OF FABRICATING THE SAME

(75) Inventors: Hyun Jae Kim, Seoul (KR); Tae Hun Jung, Seoul (KR); Seung Min Lee, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 101 days.

(21) Appl. No.: 12/021,613

(22) Filed: Jan. 29, 2008

(65) Prior Publication Data
US 2008/0278795 A1    Nov. 13, 2008

(30) Foreign Application Priority Data
May 10, 2007    (KR)    ............... 10-2007-0045662

(51) Int. Cl.
  *G02B 26/00*    (2006.01)
  *G09G 3/34*    (2006.01)
(52) U.S. Cl. ..................... 359/296; 345/107
(58) Field of Classification Search ............. 359/296; 345/107; 430/32; 204/600
See application file for complete search history.

(56) References Cited

U.S. PATENT DOCUMENTS 6,950,226 B2 * 9/2005 Endo et al. ............... 359/296

FOREIGN PATENT DOCUMENTS

| KR | 10-2000-070618 | 11/2000 |
| KR | 2001-0035879 | 5/2001 |
| KR | 10-2005-110392 | 11/2005 |
| KR | 10-2006-0110205 | 10/2006 |
| KR | 10-2006-0127223 | 12/2006 |

* cited by examiner

*Primary Examiner*—William C Choi
(74) *Attorney, Agent, or Firm*—Rabin & Berdo, PC (57) ABSTRACT

Provided is a flexible electrophoretic display. The flexible electrophoretic display includes a grayscale representation unit for representing grayscales in unit areas using reflection and transmission; upper and lower electrodes for applying a voltage to the grayscale representation unit; and a plurality of colored particles formed on the upper electrode for representing color. The upper electrode is formed of a transparent conductive material. External incident light is reflected by the colored particles formed on the upper electrode for color implementation by the flexible electrophoretic display. Thus, a compact, flexible electrophoretic display capable of displaying a high-definition image with multi-color and multi-gradation can be implemented by using multi-colored particle layers formed of metallic nano-particles.

12 Claims, 6 Drawing Sheets

FLEXIBLE ELECTROPHORETIC DISPLAY AND METHOD OF FABRICATING THE SAME

CROSS-REFERENCE TO RELATED APPLICATION

This application claims the benefit of Korean Patent Application No. 10-2007-0045662, filed May 10, 2007, the disclosure of which is hereby incorporated herein by reference in its entirety.

BACKGROUND OF THE INVENTION

1. Field of the Invention

The present invention relates to a flexible electrophoretic display and a method of fabricating the same, and more particularly, to a compact, flexible electrophoretic display capable of displaying a high-definition image with multi-color and multi-gradation by using colored particle layers formed of metallic nano-particles.

2. Discussion of Related Art

In recent years, flexible electrophoretic displays have been implemented by a method using particle technology, a method using an electrowetting phenomenon, or a method using an electrochromic material. Bistable flexible electrophoretic displays have been implemented by a method using bistable twisted nematic or cholesteric liquid crystal (LC), or ferroelectric LC. Moreover, flexible electrophoretic displays have been implemented by a method using Micro-Electro-Mechanical Systems (MEMS) capable of easily implementing a full-color moving picture.

A considerable amount of research is being conducted into various color and moving-picture representations for implementing a flexible electrophoretic display. However, such a display is still difficult to commercialize due to its high manufacturing cost.

Figure 1:
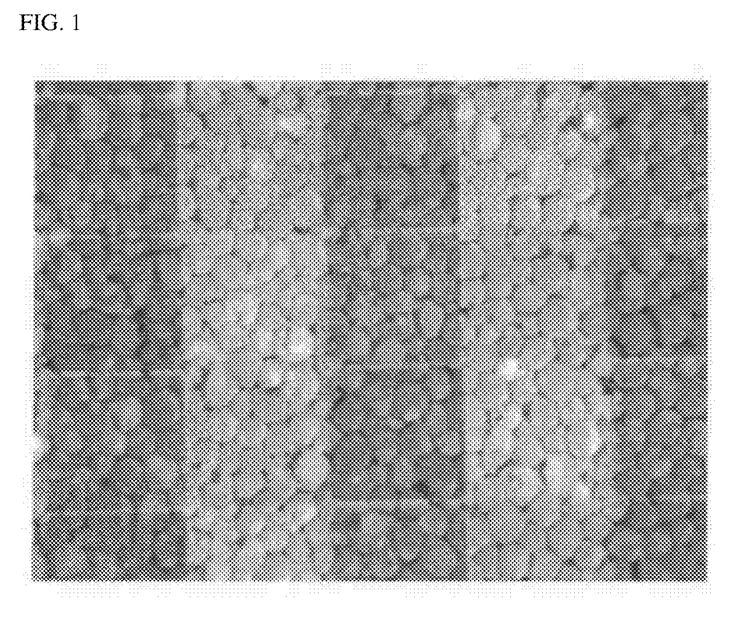
FIG. 1 is an optical microscope image showing the layout of a conventional flexible electrophoretic display using a color filter for a TFT-LCD.

FIG. 1 is an optical microscope image showing the layout of a conventional flexible electrophoretic display using a color filter for a TFT-LCD, which is disclosed in A. Bouchard, H. Doshi, B. Kalhori and A. Oleson, "Advances in Active-Matrix Color Displays Using Electrophoretic Ink and Color Filters", SID 06 DIGEST, pp 1934-1937 (2006). The flexible electrophoretic display using a color filter is costly and has greatly reduced reflectivity. Moreover, a flexible electrophoretic display using electrophoresis particles has low brightness, narrow viewing angle and low representation power.

SUMMARY OF THE INVENTION

The present invention is directed to a compact, flexible electrophoretic display capable of displaying a high-definition image with multi-color and multi-gradation by using colored particle layers formed of metallic nano-particles, and a method of fabricating the same.

The present invention is also directed to a flexible electrophoretic display comprising colored particle layers that can be easily formed of metallic nano-particles by a slurry process, a screen printing process, an ink-jet process, or a nano-imprinting process, which have high industrial applicability, and a method of fabricating the same.

A first aspect of the present invention provides a multi-color, flexible electrophoretic display, comprising: a grayscale representation unit for representing grayscales in unit areas using reflection and transmission; upper and lower electrodes for applying a voltage to the grayscale representation unit; and a plurality of colored particles formed on the upper electrode for representing color, wherein the upper electrode is formed of a transparent conductive material, and external incident light is reflected by the colored particles formed on the upper electrode for color implementation by the flexible electrophoretic display.

Preferably, the grayscale representation unit may comprise a plurality of microcapsules, each including white particles with a first charge and black particles with a second charge. The transparent conductive material may comprise a plurality of colored particles for representing color.

A second aspect of the present invention provides a multi-color, flexible electrophoretic display, comprising: a grayscale representation unit for representing grayscales in unit areas using reflection and transmission; upper and lower electrodes for applying a voltage to the grayscale representation unit; and a plurality of colored particles formed beneath the lower electrode for representing color, wherein the upper and lower electrodes are formed of a transparent conductive material, and external incident light is reflected by the colored particles formed beneath the lower electrode for color implementation by the flexible electrophoretic display.

Preferably, the grayscale representation unit may comprise a plurality of microcapsules, each including charged black particles. The transparent conductive material of the lower electrode may comprise a plurality of colored particles for representing color. A voltage applied to the microcapsules via the upper and lower electrodes may be adjusted to obtain a first state where the black particles increase an exposed area of the lower electrode and a second state where the black particles decrease the exposed area of the lower electrode. The plurality of colored particles may comprise metallic nano-particles. Gradation of the flexible electrophoretic display may be determined by magnitude of the voltage applied to the microcapsules of the grayscale representation unit via the upper and lower electrodes. Gradation of the flexible electrophoretic display may be determined by rising time of the voltage applied to the microcapsules of the grayscale representation unit via the upper and lower electrodes.

A third aspect of the present invention provides a method of fabricating a multi-color, flexible electrophoretic display, comprising the steps of: forming a lower electrode; forming a grayscale representation unit on the lower electrode for representing grayscales in unit areas using reflection and transmission; forming an upper electrode of a transparent conductive material on the grayscale representation unit; and forming a plurality of colored particles on the upper electrode.

Preferably, the step of forming a plurality of colored particles on the upper electrode may further comprise the steps of: forming a slurry including first colored particles to a predetermined thickness on the upper electrode and then forming a first colored particle layer in a predetermined pattern by irradiating the slurry with ultraviolet rays; forming a slurry including second colored particles to a predetermined thickness on the upper electrode having the first colored particle layer and then forming a second colored particle layer in a predetermined pattern by irradiating the slurry with ultraviolet rays; and forming a slurry including third colored particles to a predetermined thickness on the upper electrode having the first and second colored particle layers and then forming a third colored particle layer in a predetermined pattern by irradiating the slurry with ultraviolet rays. The step of forming a plurality of colored particles on the upper electrode may further comprise the steps of: coating the upper electrode with paste including first colored particles through a screen having a predetermined pattern to form a first colored particle layer; coating the upper electrode having the first colored particle layer with paste including second colored particles through a screen having a predetermined pattern to form a second colored particle layer; and coating the upper electrode having the first and second colored particle layers with paste including third colored particles through a screen having a predetermined pattern to form a third colored particle layer. The step of forming a plurality of colored particles on the upper electrode may further comprise the step of injecting first, second and third colored particles onto the upper electrode through corresponding injection nozzles to form first, second and third colored particle layers. The step of forming a plurality of colored particles on the upper electrode may further comprise the steps of: forming a stamp having a predetermined pattern; coating the stamp with first, second and third colored particles; and stamping the upper electrode with the stamp coated with the first, second and third colored particles to form first, second and third colored particle layers. The step of forming a grayscale representation unit may further comprise the step of forming a plurality of microcapsules, each including white particles with a first charge and black particles with a second charge.

A fourth aspect of the present invention provides a method of fabricating a multi-color, flexible electrophoretic display, comprising the steps of: forming a lower electrode; forming a plurality of colored particles on the lower electrode; forming a grayscale representation unit for representing grayscales in unit areas using reflection and transmission; and forming an upper electrode of a transparent conductive material on the grayscale representation unit.

Preferably, the step of forming a plurality of colored particles on the lower electrode may further comprise the steps of: forming a slurry including first colored particles to a predetermined thickness on the lower electrode and then forming a first colored particle layer in a predetermined pattern by irradiating the slurry with ultraviolet rays; forming a slurry including second colored particles to a predetermined thickness on the lower electrode having the first colored particle layer and then forming a second colored particle layer in a predetermined pattern by irradiating the slurry with ultraviolet rays; and forming a slurry including third colored particles to a predetermined thickness on the lower electrode having the first and second colored particle layers and then forming a third colored particle layer in a predetermined pattern by irradiating the slurry with ultraviolet rays. The step of forming a plurality of colored particles on the lower electrode may further comprise the steps of: coating the lower electrode with paste including first colored particles through a screen having a predetermined pattern to form a first colored particle layer; coating the lower electrode having the first colored particle layer with paste including second colored particles through a screen having a predetermined pattern to form a second colored particle layer; and coating the lower electrode having the first and second colored particle layers with paste including third colored particles through a screen having a predetermined pattern to form a third colored particle layer. The step of forming a plurality of colored particles on the lower electrode may further comprise the step of injecting first, second and third colored particles onto the lower electrode through corresponding injection nozzles to form first, second and third colored particle layers. The step of forming a plurality of colored particles on the lower electrode may further comprise the steps of: forming a stamp having a predetermined pattern; coating the stamp with first, second and third colored particles; and stamping the lower electrode with the stamp coated with the first, second and third colored particles to form first, second and third colored particle layers. The step of forming a grayscale representation unit may further comprise the step of forming a plurality of microcapsules, each including charged black particles. The plurality of colored particles may comprise metallic nano-particles.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. The present invention is not limited to the exemplary embodiments disclosed below, but rather can be implemented in various forms. The following exemplary embodiments are described in order to fully enable those of ordinary skill in the art to embody and practice the present invention.

Figure 2:
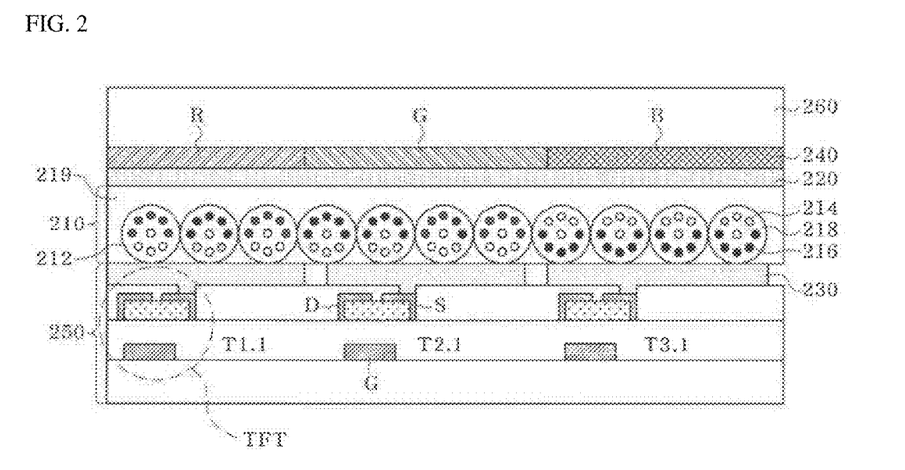
FIG. 2 is a schematic cross-sectional view of a flexible electrophoretic display according to a first exemplary embodiment of the present invention.

FIG. 2 is a schematic cross-sectional view of a flexible electrophoretic display according to a first exemplary embodiment of the present invention.

A flexible electrophoretic display for representing a multi-color comprises a grayscale representation unit 210, an upper electrode 220, a plurality of colored particles 240, and a TFT substrate 250 including a lower electrode 230.

The grayscale representation unit 210 represents grayscales in unit areas, e.g., R, G and B pixels, using light reflection and transmission. The grayscale representation unit 210 comprises a plurality of microcapsules 212, each including white particles 214 with a first charge, e.g., a negative charge, and black particles 216 with a second charge, e.g., a positive charge. Alternatively, the white particles 214 may have the second (positive) charge and the black particles 216 may have the first (negative) charge. Each microcapsule 212 contains a solvent 218 containing isopropyl alcohol (IPA). The flexible electrophoretic display further comprises a binder 219 provided between the upper electrode 220 and the lower electrode 230 for binding the microcapsules 212 to the lower electrode 230 or to one another.

The upper electrode 220 is formed of a transparent conductive material, e.g., indium tin oxide (ITO). The plurality of colored particles 240, such as R, G and B metallic nano-particles, are formed in a specific pattern on the upper electrode 220. Alternatively, the R, G and B metallic nano-particles may be included in the upper electrode 220 as a single layer. It will be easily appreciated that the R, G and B patterns may be formed by mixing the transparent conductive material with the R, G and B metallic nano-particles and sputtering the resultant material.

Here, the metallic nano-particles show different colors depending on their diameters, which are preferably determined so that the respective R, G and B colors can be represented. Of course, the plurality of colored particles 240 may be formed both in and on the upper electrode 220.

The flexible electrophoretic display may further comprise a transparent plastic substrate 260 formed as a passivation film on the upper electrode 220 or the colored particles 240. The transparent plastic substrate 260 may comprise polyethylene terephthalate (PET).

The lower electrode 230 applies a voltage to the microcapsules 212 in cooperation with the upper electrode 220.

The TFT substrate 250 including the lower electrode 230 has a four-layer structure. A first layer is the lower electrode 230 that is in contact with the microcapsules 212 of the grayscale representation unit 210. A second layer comprises drains D and sources S of TFTs T1.1, T2.1 and T3.1 formed therein. Here, the sources S of the TFTs are in contact with the lower electrode 230. A third layer comprises gates G of the TFTs T1.1, T2.1 and T3.1 formed thereon. A fourth layer is a base layer for integrally supporting the first, second and third layers. The fourth layer may be formed of glass, plastic or stainless steel foil.

Operation of the grayscale representation unit 210 will now be described in detail. When a (−) voltage is applied to the upper electrode 220 and a (+) voltage from the TFTs of the TFT substrate 250 is applied to the lower electrode 230, the negatively charged white particles 214 in the microcapsules 212 move in the direction of the lower electrode 230 and the positively charged black particles 216 move in the direction of the upper electrode 220. Accordingly, an image is displayed in black color, when viewed from the upper electrode 220. On the contrary, when a (+) voltage is applied to the upper electrode 220 and a (−) voltage from the TFTs of the TFT substrate 250 is applied to the lower electrode 230, the white particles 214 in the microcapsules 212 move in the direction of the upper electrode 220 and the black particles 216 move in the direction of the lower electrode 230. Accordingly, the image is displayed in white color, when viewed from the upper electrode 220.

Gradation of the grayscale representation unit 210 may be represented by the magnitude or rising time of the voltage applied to the microcapsules 212 via the upper electrode 220 and the lower electrode 230.

As described above, in the flexible electrophoretic display according to the first exemplary embodiment, as the black particles 216 move in the direction of the lower electrode 230 and the white particles 214 move in the direction of the upper electrode 220, R, G and B colors are respectively represented by the R, G and B colored particles in the upper electrode 220 and the gradation is represented by the magnitude or rising time of the voltage applied to the upper electrode 220 and the lower electrode 230, such that a high-definition image is displayed with multi-color and multi-gradation. The presence of the colored particles in or on the upper electrode 220 can lead to improved reflectivity.

Figure 3:
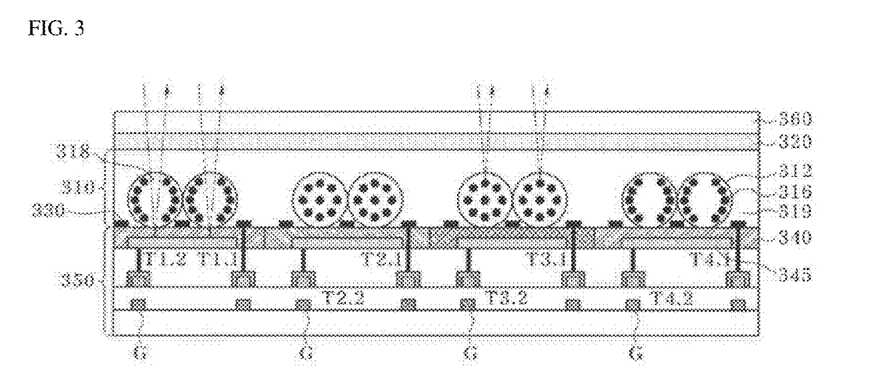
FIG. 3 is a schematic cross-sectional view of a flexible electrophoretic display according to a second exemplary embodiment of the present invention.

FIG. 3 is a schematic cross-sectional view of a flexible electrophoretic display according to a second exemplary embodiment of the present invention.

A flexible electrophoretic display for representing a multi-color comprises a grayscale representation unit 310, an upper electrode 320, a plurality of colored particles 340, and a TFT substrate 350 including a lower electrode 330 and a reflective electrode 345.

The grayscale representation unit 310 represents grayscales in unit areas, e.g., R, G and B pixels, using light reflection and transmission. The grayscale representation unit 310 comprises a plurality of microcapsules 312, each including black particles 316 with either negative or positive charge. Each microcapsule 312 contains a solvent 318 containing IPA. The flexible electrophoretic display further comprises a binder 319 provided between the upper electrode 320 and the lower electrode 330 for binding the microcapsules 312 the lower electrode 330 and to one another.

Preferably, the upper electrode 320 is formed of a transparent conductive material, e.g., ITO. Meanwhile, the upper electrode 320 is not necessarily required in the second exemplary embodiment. That is, the flexible electrophoretic display may further comprise a transparent plastic substrate 360 formed as a passivation film directly on the grayscale representation unit 310 without the upper electrode 320. The transparent plastic substrate 360 may comprise PET.

The plurality of colored particles 340, such as R, G and B metallic nano-particles, are formed in a specific pattern on the lower electrode 330. Alternatively, the R, G and B metallic nano-particles may be included in the lower electrode 330 in a specific pattern. An electric field is formed in a specific direction around the microcapsules 312 by a voltage applied to the lower electrode 330 or across the lower electrode 330 and the upper electrode 320. A Coulomb force moves the charged black particles in the microcapsules 312 in the electric field. Here, the lower electrode 330 is in contact with the TFTs of the TFT substrate through the plurality of colored particles 340, which may be formed on either the top or bottom of the lower electrode 330.

The TFT substrate 350 has a four-layer structure. A first layer comprises the lower electrode 330 that is in contact with the grayscale representation unit 310, the R, G and B colored particles 340, and the reflective electrode 345. A second layer comprises TFTs T1.1, T2.1 and T3.1 for controlling the lower electrode and TFTs T1.2, T2.2 and T3.2 for controlling the reflective electrode. A third layer comprises gates G of the TFTs T1.1, T1.2, T2.1, T2.2, T3.1 and T3.2 formed thereon. A fourth layer is a base layer for integrally supporting the first, second and third layers. The fourth layer is formed of glass. Here, the reflective electrode 345 comprises a high-reflectivity metal, e.g., aluminum (Al).

Operation of the grayscale representation unit 310 will now be described in detail. By way of example, when a (+) voltage from the TFTs of the TFT substrate 350 is applied to the lower electrode 330, the negatively charged black particles 316 in the microcapsules 312 move in a direction that increases an exposed area of the R colored particles. Accordingly, an image is displayed in color resulting from the R colored particles, when viewed from the upper electrode 320. On the contrary, when the voltage from the TFTs of the TFT substrate 350 is not applied to the lower electrode 330 or a (−) voltage is applied to the lower electrode 330, the negatively charged black particles 316 in the microcapsules 312 move in a direction that decreases the exposed area of the R colored particles. Accordingly, an image is displayed in black color, when viewed from the upper electrode 320.

Gradation of the grayscale representation unit 310 may be represented by the magnitude or rising time of the voltage applied via the lower electrode 330.

As described above, as the black particles 316 move in the direction of the lower electrode 330, R, G and B colors are respectively represented by the R, G and B colored particles formed on the bottom of the lower electrode 330, and the gradation is represented by the magnitude or rising time of the voltage applied to the lower electrode 330, so that a high-definition image can be displayed with multi-color and multi-gradation. The presence of the reflective layer 345 beneath the colored particles 340 can lead to improved reflectivity.

FIGS. 4a to 4e are schematic cross-sectional views illustrating a process of fabricating the flexible electrophoretic display of FIG. 2.

Figure 4A:
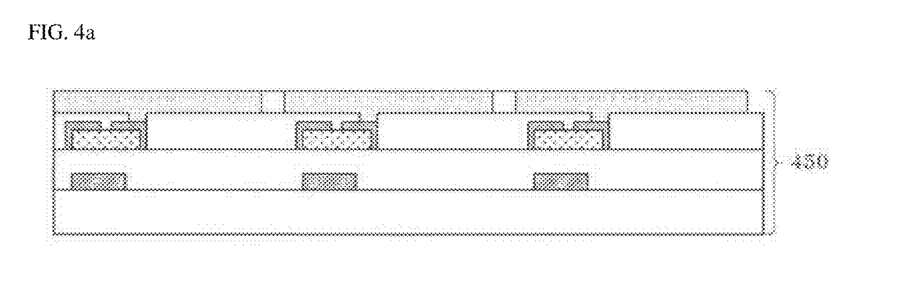
FIGS. 4a to 4e are schematic cross-sectional views illustrating a process of fabricating the flexible electrophoretic display of FIG. 2.

First, a TFT substrate 450 is formed (see FIG. 4a). Specifically, a base layer of glass is formed, gates, drains and sources of TFTs T1.1, T2.1 and T3.1 are formed, and a lower electrode is formed in contact with microcapsules of a grayscale representation unit 410.

Figure 4B:
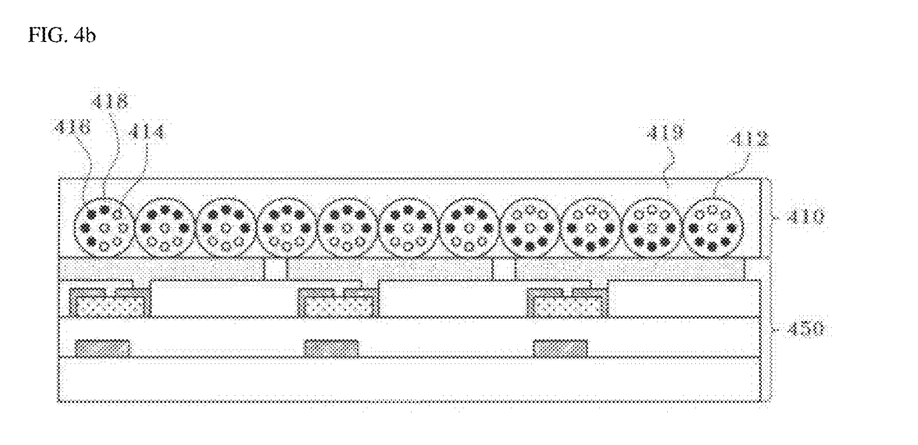

The grayscale representation unit 410 is then formed on the lower electrode for representing grayscales in unit areas using light reflection and transmission (see FIG. 4b). The step of forming the grayscale representation unit 410 comprises a step of forming a plurality of microcapsules 412, each including white particles 414 with a first charge and black particles 416 with a second charge. The process further comprises a step of forming a binder 419 between the upper electrode and the lower electrode for binding the microcapsules 412 to the lower electrode and to one another.

Figure 4C:
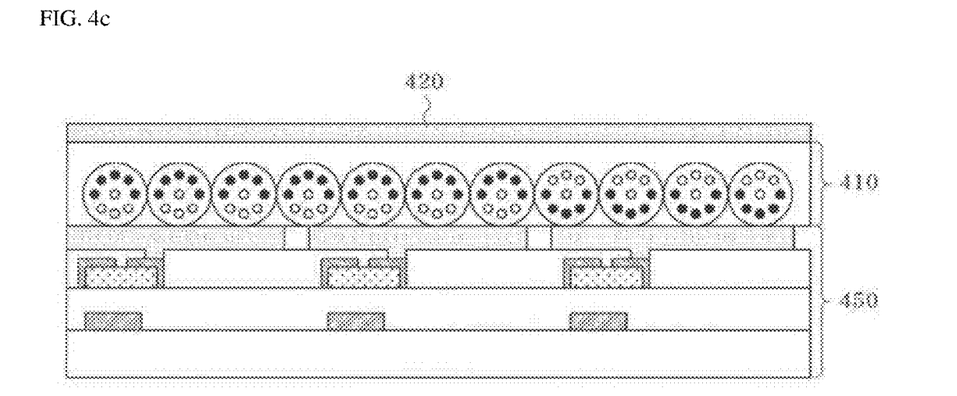

An upper electrode 420 is then formed of a transparent conductive material on the grayscale representation unit 410 (see FIG. 4c).

Figure 4D:
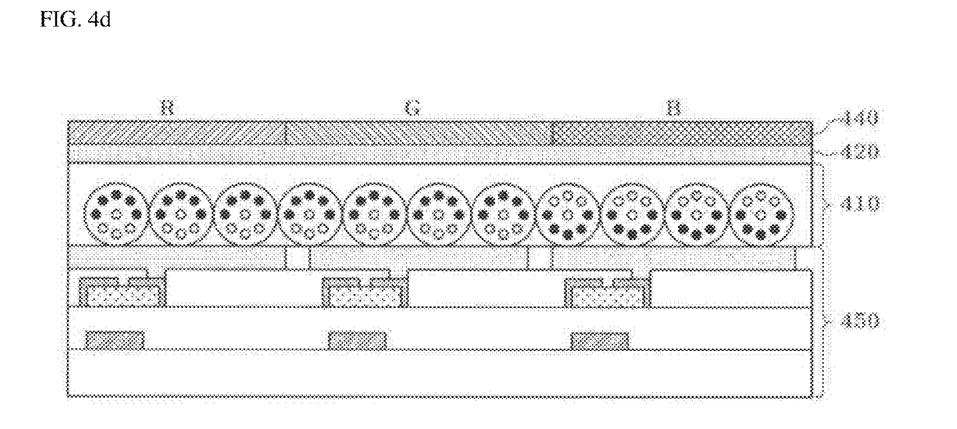

A plurality of colored particles, e.g., R, G and B colored particles 440, are then formed on the upper electrode 420 (see FIG. 4d). Alternatively, a plurality of colored particles may be included in the upper electrode 420.

Meanwhile, the plurality of colored particles may be formed by a slurry process, a screen printing process, an ink-jet process, or a nano-imprinting process. The plurality of colored particles may comprise metallic nano-particles.

If the slurry process is used, the step of forming the plurality of colored particles 440 comprises the steps of: forming a slurry including first colored particles, e.g., R colored particles, to a predetermined thickness on the upper electrode 420 and then forming a first colored particle layer in a predetermined pattern by irradiating the slurry with ultraviolet rays; forming a slurry including second colored particles to a predetermined thickness on the upper electrode having the first colored particle layer and then forming a second colored particle layer in a predetermined pattern by irradiating the slurry with ultraviolet rays; and forming a slurry including third colored particles to a predetermined thickness on the upper electrode having the first and second colored particle layers and then forming a third colored particle layer in a predetermined pattern by irradiating the slurry with ultraviolet rays.

If the screen printing process is used, the step of forming the plurality of colored particles 440 comprises the steps of: coating the upper electrode 420 with paste including first colored particles through a screen having a predetermined pattern to form a first colored particle layer; coating the upper electrode 420 having the first colored particle layer with paste including second colored particles through a screen having a predetermined pattern to form a second colored particle layer; and coating the upper electrode 420 having the first and second colored particle layers with paste including third colored particles through a screen having a predetermined pattern to form a third colored particle layer.

If the ink-jet process is used, the step of forming the plurality of colored particles 440 comprises the step of injecting first, second and third colored particles onto the upper electrode 420 through corresponding injection nozzles to form first, second and third colored particle layers.

If the nano-imprinting process is used, the step of forming the plurality of colored particles 440 comprises the steps of: forming a stamp having a predetermined pattern, coating the stamp with first, second and third colored particles, and stamping the upper electrode with the stamp coated with the first, second and third colored particles to form first, second and third colored particle layers.

Figure 4E:
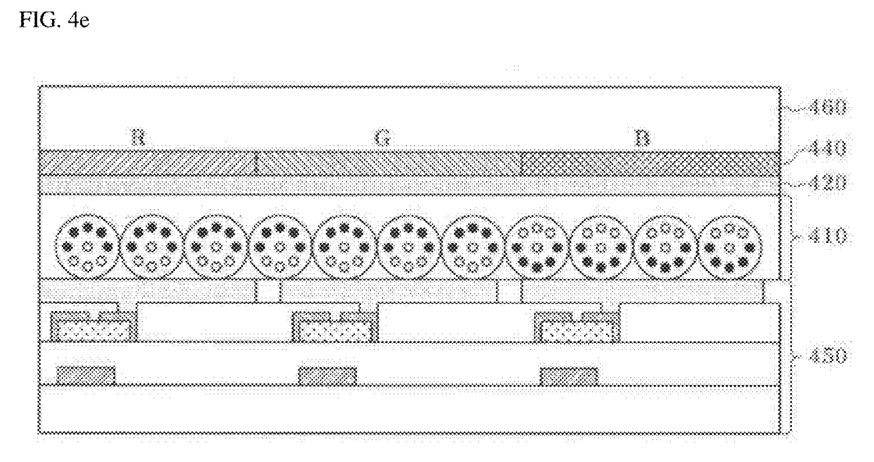

A transparent plastic substrate 460 including PET is then formed as a passivation film on the plurality of colored particles 440 (see FIG. 4e).

FIGS. 5a to 5e are schematic cross-sectional views illustrating a process of fabricating the flexible electrophoretic display of FIG. 3.

Figure 5A:
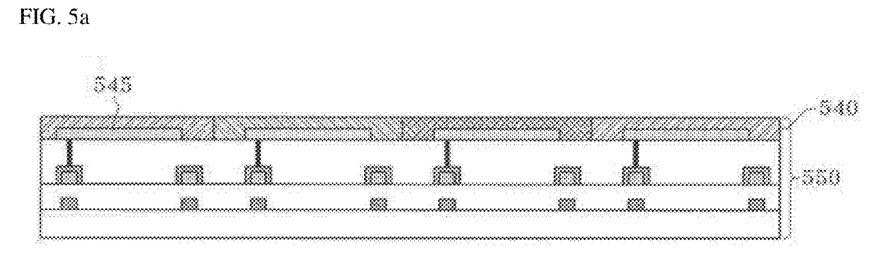
FIGS. 5a to 5e are schematic cross-sectional views illustrating a process of fabricating the flexible electrophoretic display of FIG. 3.
Figure 5B:
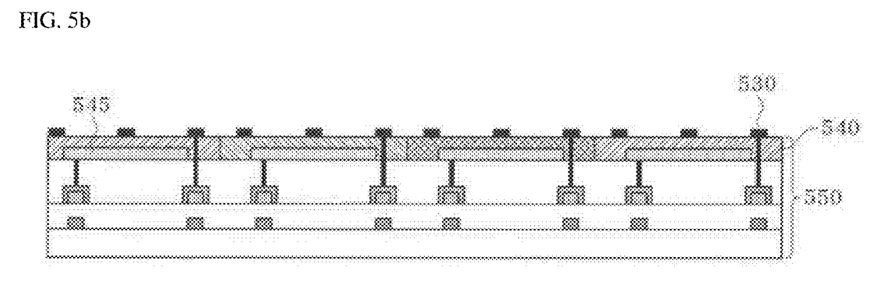

First, a TFT substrate 550 is formed (see FIGS. 5a and 5b). Specifically, a base layer of glass is formed, gates of TFTs T1.1, T1.2, T2.1, T2.2, T3.1 and T3.2 are formed, and TFTs T1.1, T2.1, T3.1 . . . for controlling a lower electrode and TFTs T1.2, T2.2, T3.2, . . . for controlling a reflective electrode are formed. Also, a lower electrode 530 that is in contact with a grayscale representation unit, R, G and B colored particles 540, and a reflective electrode 545 are formed. Here, the reflective electrode 545 comprises a high-reflectivity metal, e.g., aluminum (Al). A plurality of colored particles may be included in an upper electrode.

Meanwhile, the plurality of colored particles 540 may be formed by a slurry process, a screen printing process, an ink-jet process, and a nano-imprinting process. The plurality of colored particles may comprise metallic nano-particles.

If the slurry process is used, the step of forming the plurality of colored particles 540 comprises the steps of: forming a slurry including first colored particles to a predetermined thickness on the lower electrode 530 and then forming a first colored particle layer in a predetermined pattern by irradiating the slurry with ultraviolet rays; forming a slurry including second colored particles to a predetermined thickness on the lower electrode 530 having the first colored particle layer and then forming a second colored particle layer in a predetermined pattern by irradiating the slurry with ultraviolet rays; and forming a slurry including third colored particles to a predetermined thickness on the lower electrode 530 having the first and second colored particle layers and then forming a third colored particle layer in a predetermined pattern by irradiating the slurry with ultraviolet rays.

If the screen printing process is used, the step of forming the plurality of colored particles 540 comprises the steps of: coating the lower electrode 530 with paste including first colored particles through a screen having a predetermined pattern to form a first colored particle layer; coating the lower electrode 530 having the first colored particle layer with paste including second colored particles through a screen having a predetermined pattern to form a second colored particle layer; and coating the lower electrode 530 having the first and second colored particle layers with paste including third colored particles through a screen having a predetermined pattern to form a third colored particle layer.

If the ink-jet process is used, the step of forming the plurality of colored particles 540 comprises the step of injecting first, second and third colored particles onto the lower electrode 530 through corresponding injection nozzles to form first, second and third colored particle layers.

If the nano-imprinting process is used, the step of forming the plurality of colored particles 540 comprises the steps of: forming a plurality of colored particles on the lower electrode 530, forming a stamp having a predetermined pattern, coating the stamp with first, second and third colored particles, and stamping the lower electrode 530 with the stamp coated with the first, second and third colored particles to form first, second and third colored particle layers.

Figure 5C:
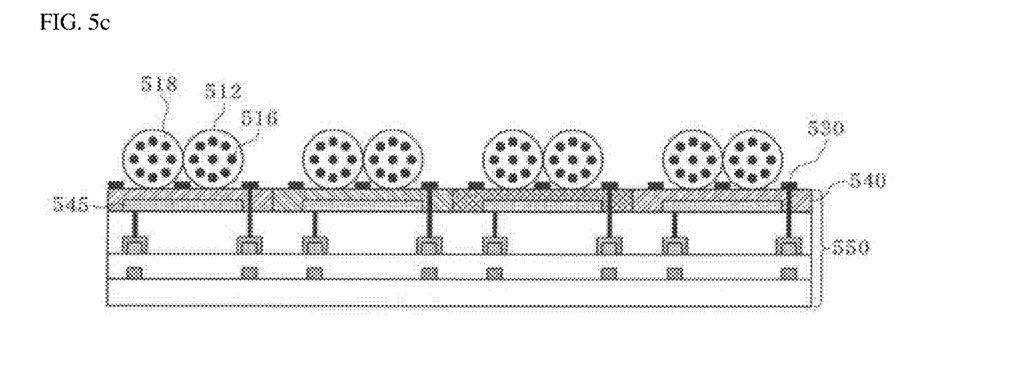
Figure 5D:
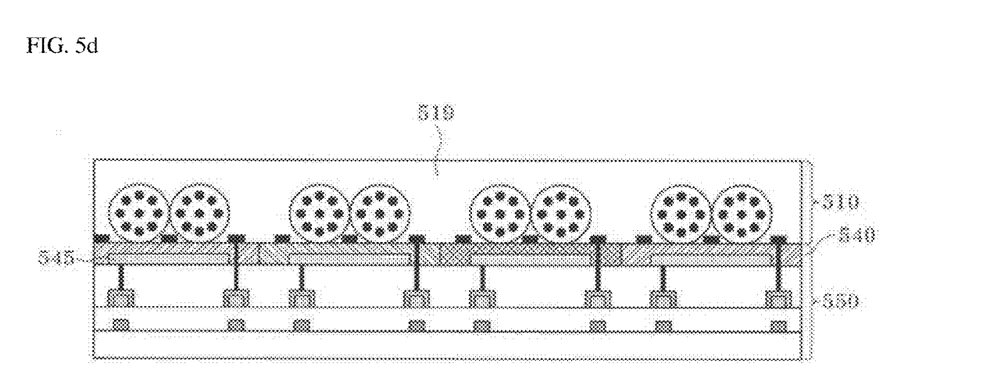

A grayscale representation unit 510 is then formed on the plurality of colored particles 540 for representing grayscales in unit areas using light reflection and transmission (see FIGS. 5c and 5d). The step of forming the grayscale representation unit 510 further comprises the step of forming a plurality of microcapsules 512, each including charged black particles. The process further comprises the step of forming a binder 519 between the upper electrode 520 and the lower electrode 530 for binding the microcapsules to the lower electrode 530 and to one another.

Figure 5E:
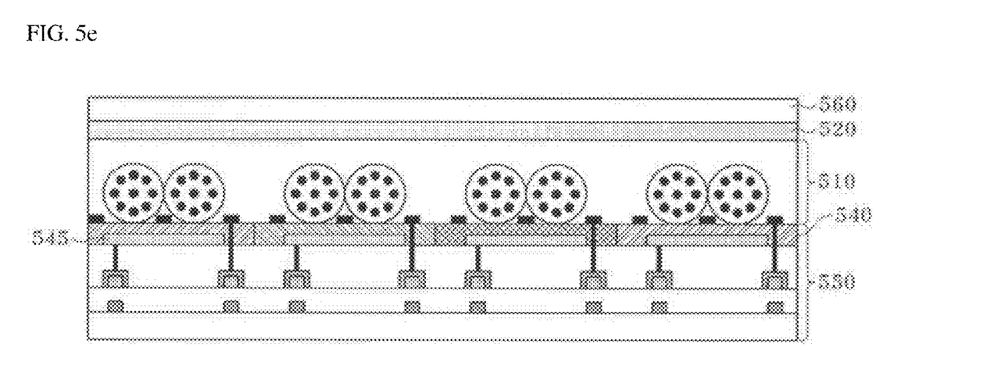

The upper electrode 520 is then formed of a transparent conductive material on the grayscale representation unit 510, and a transparent plastic substrate 560 including PET is then formed as a passivation film on the upper electrode 520 (see FIG. 5e).

Figure 6:
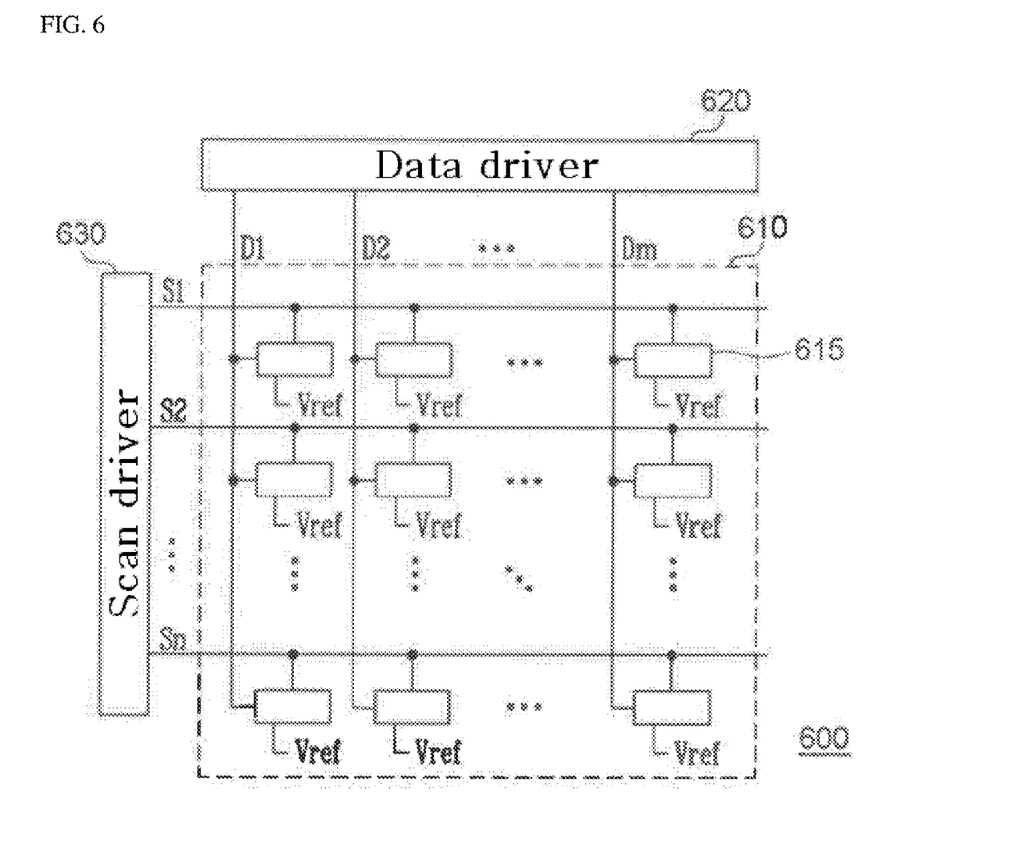
FIG. 6 is a schematic circuit diagram illustrating an example of a driving circuit for driving the flexible electrophoretic display of FIG. 2 or 3.

FIG. 6 is a schematic circuit diagram illustrating an example of a driving circuit for driving the flexible electrophoretic display of FIG. 2 or 3.

The driving circuit 600 comprises an image display part 610, a data driver 620, and a scan driver 630.

The image display part 610 displays an image and comprises a plurality of pixels 615 including thin film transistors and an electrophoretic display (EPD); a plurality of scan lines S1, S2, ..., $S_{n1}$, and $S_n$ for transferring a scanning signal to the pixels 615; and a plurality of data lines D1, D2, ..., $D_{m1}$, and $D_m$ for transferring a data signal to the pixels 615.

The data driver 620 provides the data signal to the image display part 610. The data signal is applied to the drain or gate of each TFT included in the TFT substrate for the flexible electrophoretic display according to the first and second exemplary embodiments.

The scan driver 630 provides the scan signal to the image display part 610. The scan signal is applied to the drain or gate of each TFT included in the TFT substrate for the flexible electrophoretic display according to the first and second exemplary embodiments.

According to the present invention as described above, R, G and B colored particle layers are formed using metallic nano-particles rather than a color filter for a conventional TFT-LCD. Thus, a compact, flexible electrophoretic display is achieved that can display a high-definition image with multi-color and multi-gradation.

Furthermore, the colored particle layers can be easily formed of metallic nano-particles by a slurry process, a screen printing process, an ink-jet process, and a nano-imprinting process, which have high industrial applicability.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A multi-color, flexible electrophoretic display, comprising:
   a grayscale representation unit for representing grayscales in unit areas using reflection and transmission;
   upper and lower electrodes for applying a voltage to the grayscale representation unit; and
   a plurality of colored particles formed on the upper electrode for representing color,
   wherein the upper electrode is formed of a transparent conductive material, and external incident light is reflected by the colored particles formed on the upper electrode for color implementation by the flexible electrophoretic display.

2. The display of claim 1, wherein the grayscale representation unit comprises a plurality of microcapsules, each including white particles with a first charge and black particles with a second charge.

3. The display of claim 2, wherein gradation of the flexible electrophoretic display is determined by magnitude of the voltage applied to the microcapsules of the grayscale representation unit via the upper and lower electrodes.

4. The display of claim 2, wherein gradation of the flexible electrophoretic display is determined by rising time of the voltage applied to the microcapsules of the grayscale representation unit via the upper and lower electrodes.

5. The display of claim 1, wherein the transparent conductive material comprises a plurality of colored particles for representing color.

6. The display of claim 1, wherein the plurality of colored particles comprise metallic nano-particles.

7. A method of fabricating a multi-color, flexible electrophoretic display, comprising the steps of:
   forming a lower electrode;
   forming a grayscale representation unit on the lower electrode for representing grayscales in unit areas using reflection and transmission;
   forming an upper electrode of a transparent conductive material on the grayscale representation unit; and
   forming a plurality of colored particles on the upper electrode.

8. The method of claim 7, wherein the step of forming a plurality of colored particles on the upper electrode further comprises the steps of:
   forming a slurry including first colored particles to a predetermined thickness on the upper electrode and then forming a first colored particle layer in a predetermined pattern by irradiating the slurry with ultraviolet rays;
   forming a slurry including second colored particles to a predetermined thickness on the upper electrode having the first colored particle layer and then forming a second colored particle layer in a predetermined pattern by irradiating the slurry with ultraviolet rays; and
   forming a slurry including third colored particles to a predetermined thickness on the upper electrode having the first and second colored particle layers and then forming a third colored particle layer in a predetermined pattern by irradiating the slurry with ultraviolet rays.

9. The method of claim 7, wherein the step of forming a plurality of colored particles on the upper electrode further comprises the steps of:
   coating the upper electrode with paste including first colored particles through a screen having a predetermined pattern to form a first colored particle layer;
   coating the upper electrode having the first colored particle layer with paste including second colored particles through a screen having a predetermined pattern to form a second colored particle layer; and
   coating the upper electrode having the first and second colored particle layers with paste including third colored particles through a screen having a predetermined pattern to form a third colored particle layer.

10. The method of claim 7, wherein the step of forming a plurality of colored particles on the upper electrode further comprises the step of injecting first, second and third colored particles onto the upper electrode through corresponding injection nozzles to form first, second and third colored particle layers.

11. The method of claim 7, wherein the step of forming a plurality of colored particles on the upper electrode further comprises the steps of:

forming a stamp having a predetermined pattern;

coating the stamp with first, second and third colored particles; and stamping the upper electrode with the stamp coated with the first, second and third colored particles to form first, second and third colored particle layers.

12. The method of claim 7, wherein the step of forming a grayscale representation unit further comprises the step of forming a plurality of microcapsules, each including white particles with a first charge and black particles with a second charge.

* * * * *